UNITED STATES PATENT OFFICE.

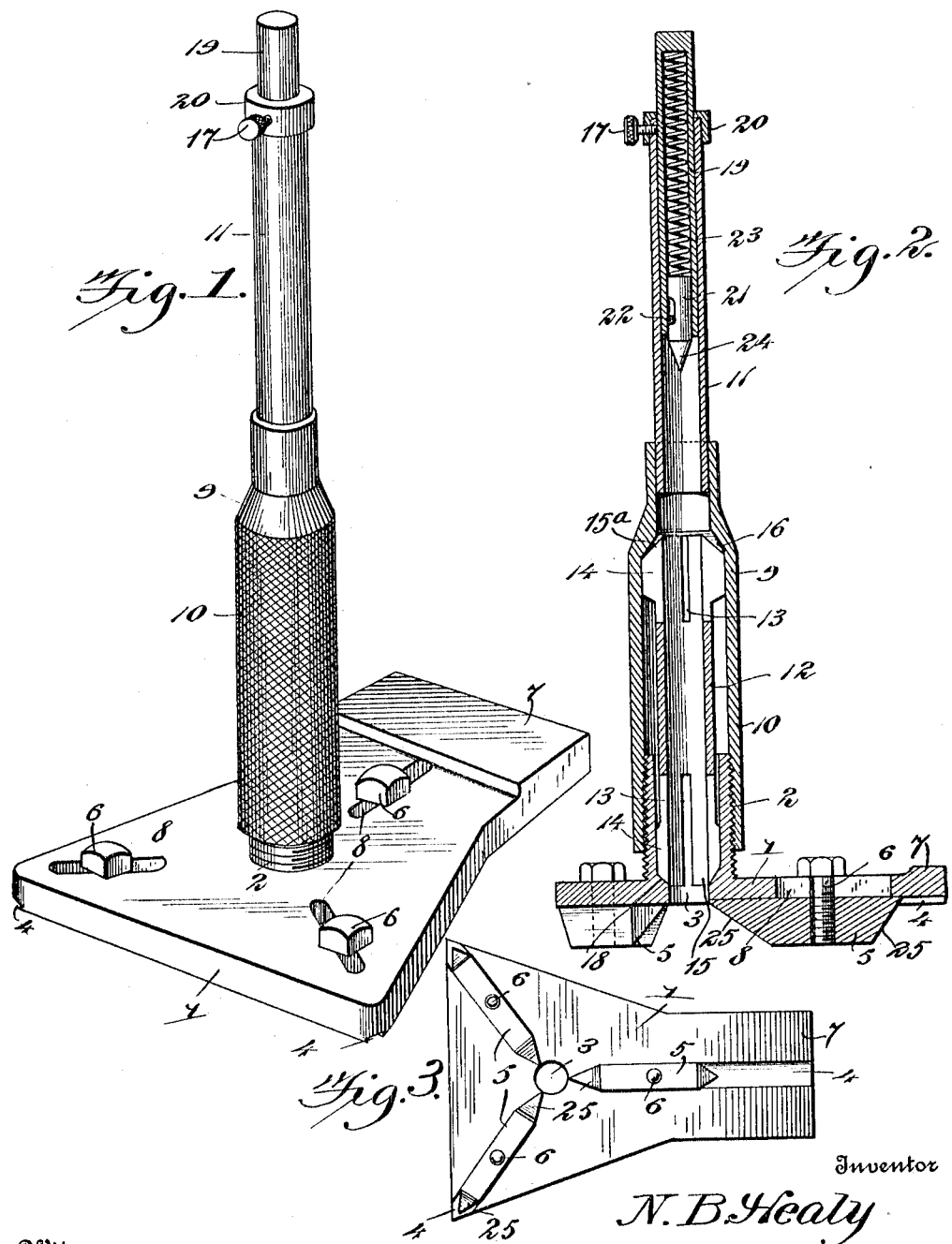

NORMAN B. HEALY, OF FREDONIA, NEW YORK.

VALVE-DRESSING TOOL.

1,115,071.  Specification of Letters Patent.  Patented Oct. 27, 1914.

Application filed July 21, 1913. Serial No. 780,237.

*To all whom it may concern:*

Be it known that I, NORMAN B. HEALY, a citizen of the United States, residing at Fredonia, in the county of Chautauqua and State of New York, have invented new and useful Improvements in Valve - Dressing Tools, of which the following is a specification.

This invention relates to that class of tools for dressing the seating faces of valves which comprises a cutter head or face plate provided on its front side with dressing or cutting devices, and a holder for the valve stem which extends rearwardly from the cutter head or face plate and in which the valve stem is centered and rotatably held, the dressing tool being held stationary and the valve and its stem being rotated in the tool for dressing the valve.

The objects of this invention are to provide the dressing tool with a centering valve stem holder which is simple, convenient and durable, and to provide means for adjusting the tool to valves of different sizes or bevels.

In the accompanying drawings: Figure 1 is a perspective view of a valve dressing tool embodying the invention. Fig. 2 is a longitudinal sectional elevation thereof. Fig. 3 is a front elevation thereof.

1 represents the cutter head or face plate which is provided with an opening 3 through which the stem of the valve to be dressed is passed. The cutter head is provided at its front face with suitable dressing devices or cutters 5 which are preferably removably secured on the cutter head and adjustable toward and from the center or opening 3 in radial guides or grooves 4 formed in the face of the cutter head. The cutters 5 may be held in their adjusted positions in the guides 4 by any suitable means, such as bolts 6, passing through slots 8 in the cutter head and engaging in threaded holes in the cutters. By adjusting the cutters in the grooves toward and from the center, the cutter head is adapted to operate on valves of different diameters. The cutter head is preferably provided with a laterally projecting attaching portion 7 which can be held in a vise (not shown), or the cutter head can be otherwise secured in the operative position.

A holding and centering device 9 for the valve stem is secured to the rear side of the cutter head concentric with the opening 3. This device is constructed as follows: 2 represents an externally threaded tubular boss which extends rearwardly from the cutter head concentric with the opening 3 therein. 10 represents an adjusting sleeve which has its front portion screwthreaded and connected with the threaded boss 2 so as to be adjustable toward and from the cutter head. 12 represents a yielding bushing which is arranged with its front portion 15 within the boss 2 and with its rear portion 15ª within the rear portion of the adjustable sleeve 12 and which forms a bearing in which the valve stem is centered and in which it can be rotated. Each end portion of this bushing is provided with longitudinal slits 13 which divide the end portion into yielding jaws 14 which can be contracted or expanded to fit the valve stem. For that purpose each end of the bushing is beveled and arranged to bear against an adjacent beveled surface, one of these surfaces being adjustable lengthwise with reference to the other. The beveled front end of the bushand bears against the beveled face or shoulder 18 which is formed in the front portion of the boss 2, while the beveled rear end of the bushing bears against the beveled face or shoulder 16 which is formed in the rear portion of the adjustable sleeve 10. By adjusting the latter forwardly or toward the cutter head the yielding jaws of the bushing are contracted, and by adjusting the sleeve rearwardly they are allowed to expand. By this means the bushing is readily adjusted to the size of the valve stem so as to center the stem in the bushing and permit the stem to be rotated in the same.

It is desirable to provide an adjustable stop for limiting the amount to be cut from the valve. This stop may be of any desired construction. That shown in the drawings comprises the following parts: A tube 19 is telescopically arranged within the reduced rear part 11 of the adjusting sleeve 10. This tube may be secured in any adjusted position relatively to the adjusting sleeve by means of a set screw 17 engaging in a collar 20 secured to the end of the adjusting sleeve. The inner end of the tube 19 is provided with a plug 21 which is adapted to engage with the end of the valve stem to limit the inward movement thereof. The plug, as shown, has a limited movement relatively to the tube 19, being provided with a slot in which a pin 22 secured to the tube engages. A spring 23 in the tube 19 normally holds the plug in its projected position with regard to the tube. The plug is provided with a centering point which is adapted to engage the end of the valve stem. In the operation of the tool, the tube 19 is so adjusted in the part 11 of the sleeve 10 that it will prevent the inward movement of the valve stem after the valve has been cut to the desired depth. By turning the valve a number of times after the cutting has been completed, the seating face of the valve will receive a smooth finish which insures the accurate and tight seating of the valve when in use.

The cutters 5 may be of any suitable construction and are preferably reversible end for end. The end portions 25 of the cutters, on which the cutting edges are formed, are preferably of different inclinations so that each set of cutters is adapted to operate on two differently inclined valve faces. The cutters can be readily removed from the cutter head and replaced by others, if desired.

I claim as my invention:

1. The combination with a cutter head for dressing valves, of a holder for the valve stem extending rearwardly from the cutter head and comprising a yielding bushing which forms a bearing for the valve stem, and means for adjusting said bushing to the valve stem.

2. The combination with a cutter head for dressing valves, of a holder for the valve stem extending rearwardly from the cutter head and comprising a yielding bushing which forms a bearing for the valve stem, and a sleeve which is adjustable toward and from the cutter head and by means of which said bushing is contracted.

3. In a valve dressing tool, the combination with a cutter head having a rearwardly projecting central boss, of a sleeve which is lengthwise adjustable on said boss, and a yielding bushing forming a bearing for the valve stem and arranged with its front portion within said boss and with its rear portion within said sleeve.

4. In a valve dressing tool, the combination with a cutter head, of a holder for the valve stem comprising a bushing having yielding end portions provided with beveled faces, and beveled faces in the holder and cutter head, one of which faces is lengthwise adjustable with reference to the other.

5. The combination with a cutter head for dressing valves, of a holder for the valve stem comprising a sleeve having slitted end portions, and means coöperating with said cutter head for contracting said end portions.

6. In a valve dressing tool, the combination with a cutter head having a beveled face on its rear side, a sleeve which is adjustable toward and from the cutter head and provided with a beveled face in its rear portion, and a yielding bushing having beveled ends which bear against said beveled faces.

7. The combination with a cutter head having a hollow boss on its rear side and a beveled face within said boss, of a sleeve which is lengthwise adjustable on said boss and provided with a beveled face in its rear portion, and a bushing adapted to receive the valve stem and having slitted end portions provided with beveled ends which bear against said beveled faces.

8. The combination with a cutter head provided with valve dressing devices made adjustable toward and from the axis of the head, of a holder for the valve stem arranged axially with reference to said dressing devices and comprising a yielding bushing which forms a bearing for the valve stem, and means for adjusting said bushing to said stem.

In testimony whereof I affix my signature in presence of two witnesses.

NORMAN B. HEALY.

Witnesses:
WILLIAM J. DOTY,
WILLIS D. LEET.

---

Copies of this patent may be obtained for five cents each, by addressing the "Commissioner of Patents, Washington, D. C."